(12) United States Patent
Bray, Jr. et al.

(10) Patent No.: US 11,737,512 B2
(45) Date of Patent: Aug. 29, 2023

(54) FOOTWEAR SOLE, BOOT AND SANDAL

(71) Applicant: TOTES ISOTONER CORPORATION, Cincinnati, OH (US)

(72) Inventors: Walter T. Bray, Jr., Cincinnati, OH (US); Lex Nichols, Mason, OH (US)

(73) Assignee: TOTES ISOTONER CORPORATION, Cincinnati, OH (US)

(*) Notice: Subject to any disclaimer, the term of this patent is extended or adjusted under 35 U.S.C. 154(b) by 136 days.

(21) Appl. No.: 17/143,506

(22) Filed: Jan. 7, 2021

(65) Prior Publication Data

US 2021/0120911 A1    Apr. 29, 2021

Related U.S. Application Data (63) Continuation of application No. 16/745,929, filed on Jan. 17, 2020, now Pat. No. 10,918,161, which is a continuation-in-part of application No. 15/803,998, filed on Nov. 6, 2017, now Pat. No. 10,869,522, which is a continuation-in-part of application No. 15/343,881, filed on Nov. 4, 2016, now Pat. No. 10,772,377.

(51) Int. Cl.
| | |
|---|---|
| A43B 13/04 | (2006.01) |
| A43B 13/02 | (2022.01) |
| C08L 23/08 | (2006.01) |
| C08L 25/08 | (2006.01) |

(52) U.S. Cl.
CPC ............ *A43B 13/04* (2013.01); *A43B 13/026* (2013.01); *C08L 23/0853* (2013.01); *C08L 25/08* (2013.01); *C08J 2323/08* (2013.01); *C08L 2205/035* (2013.01)

(58) Field of Classification Search
CPC .... A43B 1/10; A43B 1/12; A43B 1/14; A43B 3/02; A43B 3/12; A43B 3/122; A43B 3/124; A43B 3/126; C08L 25/08; C08L 25/10; C08L 23/0853
See application file for complete search history.

(56) References Cited

U.S. PATENT DOCUMENTS

| | | |
|---|---|---|
| 6,797,737 B1 | 9/2004 | Hsu |
| 9,867,424 B2 | 1/2018 | Wawrousek |
| 2004/0000255 A1 | 1/2004 | Hernandez |
| 2005/0005474 A1 | 1/2005 | Lai |
| 2005/0008735 A1 | 1/2005 | Pearce |
| 2007/0289162 A1 | 12/2007 | Liu |
| 2010/0105798 A1 | 4/2010 | Hasegawa |
| 2013/0133229 A1 | 5/2013 | Ludemann |
| 2015/0086519 A1 | 3/2015 | Chow |
| 2018/0079887 A1 | 3/2018 | Chino |
| 2018/0125156 A1 | 5/2018 | Bray, Jr. |
| 2019/0281921 A1 | 9/2019 | Bray, Jr. |
| 2019/0297991 A1 | 10/2019 | Bongers |
| 2020/0156340 A1 | 5/2020 | Chen |

FOREIGN PATENT DOCUMENTS

| | | |
|---|---|---|
| CN | 102031010 A | 4/2011 |
| CN | 103709581 A | 4/2014 |
| CN | 105419069 A | 3/2016 |
| CN | 105585769 A | 5/2016 |
| CN | 107353486 A | 11/2017 |
| CN | 109251464 A | 1/2019 |
| CN | 110062589 A | 7/2019 |
| CN | 110372951 A | 10/2019 |
| EP | 2856896 A1 | 4/2015 |
| FR | 2059892 A5 | 6/1971 |
| JP | H0374439 A | 3/1991 |
| JP | 2004136018 A * | 5/2004 |
| WO | 03105618 A2 | 12/2003 |
| WO | 2006125631 A1 | 11/2006 |
| WO | 2013134354 A2 | 9/2013 |
| WO | 2013138439 A1 | 9/2013 |
| WO | 2018083676 A1 | 5/2018 |
| WO | 2019090923 A1 | 5/2019 |

OTHER PUBLICATIONS

CN 109251464 A (Jan. 2019) machine translation.*
JP 2004136018 A (May 2004) machine translation.*
Office Action issued in Chinese Appln. No. 202110054097.4 dated Dec. 21, 2021. English translation provided.
Office Action issued in European Appln. No. 21151940.0 dated Feb. 3, 2022.
Extended European Search Report issued in European Appln. No. 21151940.0 dated May 17, 2021.
Christian et al. "Preparation and Characterization of Ethylene Vinyl Acetate/Polybutadiene Rubber/Natural Rubber (EVA/BR/NR) Based Thermoplastic Elastomer for Footwear Application." International Journal of Advance Research and Innovative Ideas in Education. 2017: 5456-5460. vol. 3, Issue 2.
Srilathakutty. "Studies on New Base Materials for Microcellular Soles." Aug. 1998: 1-369. Department of Polymer Science and Rubber Technology, Cochin University of Science and Technology.
International Search Report issued in International Application No. PCT/IB2017/056930 dated Feb. 12, 2018.
Written Opinion issued in International Application No. PCT/IB2017/056930 dated Feb. 12, 2018.

(Continued)

*Primary Examiner* — Ana L. Woodward
(74) *Attorney, Agent, or Firm* — Rossi, Kimms & McDowell LLP (57) ABSTRACT

Aspects of the invention can be directed to a boot including a sole portion, a lower portion, and a boot shaft portion. The sole portion, the lower portion and the boot shaft portion can be formed as a unitary member composed of a single compound. The wherein the single compound can include: EVA in the range of 17% to 27%, POE in the range of 6% to 16%, SEBS in the range of 10% to 20%, and rubber in the range of 19% to 29%.

32 Claims, 7 Drawing Sheets

(56) References Cited

OTHER PUBLICATIONS

Office Action issued in U.S. Appl. No. 15/343,881 dated Oct. 29, 2018.
Office Action issued in U.S. Appl. No. 15/343,881 dated Nov. 5, 2018.
Office Action issued in U.S. Appl. No. 15/343,881 dated Apr. 12, 2019.
Http://precipitatedcalciumcarbonate.com Calcium Carbonate Bulking Agent (2019).
Office Action issued in U.S. Appl. No. 15/343,881 dated Sep. 27, 2019.
Extended European Search Report issued in European Appln. No. 17195561.0 dated Feb. 12, 2018.
International Preliminary Report on Patentability issued in Intl. Appln. No. PCT/IB2017/056930 dated May 16, 2019.
Office Action issued in U.S. Appl. No. 15/803,998 dated Apr. 2, 2019.
Restriction Requirement issued in U.S. Appl. No. 15/803,998 dated Oct. 29, 2018.
Office Action issued in U.S. Appl. No. 16/367,316 dated Sep. 23, 2019.
Office Action issued in U.S. Appl. No. 15/803,998 dated Nov. 20, 2019.
Office Action issued in U.S. Appl. No. 15/343,881 dated Jan. 29, 2020.
Office Action issued in U.S. Appl. No. 15/343,881 dated Feb. 5, 2020.
Notice of Allowance issued in U.S. Appl. No. 15/343,881 dated Jul. 15, 2020.
Office Action issued in U.S. Appl. No. 16/745,929 dated Jul. 17, 2020.
Notice of Allowance issued in U.S. Appl. No. 16/745,929 dated Oct. 13, 2020.
Office Action issued in U.S. Appl. No. 16/367,316 dated Apr. 10, 2020.
Office Action issued in U.S. Appl. No. 16/367,316 dated Oct. 22, 2020.
Office Action issued in U.S. Appl. No. 15/803,998 dated Mar. 6, 2020.
Notice of Allowance issued in U.S. Appl. No. 15/803,998 dated Sep. 8, 2020.
Office Action issued in Korean Appln. No. 10-2021-0006480 dated Apr. 15, 2022. English translation provided.
Office Action issued in Canadian Appln. No. 3,105,086, dated Mar. 16, 2022.
Office Action issued in Chinese Appln. No. 202110054097.4 dated Jun. 17, 2022. English machine translation provided.
Examination Report issued in Australian Appln. No. 2021200171 dated Jun. 29, 2022.
Office Action issued in Korean Appln. No. 10-2021-0006480 dated Oct. 28, 2022. English translation provided.
Office Action issued in Mexican Appln. No. MX/a/2019/004904 dated Sep. 20, 2022. English translation provided.
Notice of Allowance issued in Mexican Patent Appln. No. 2019004904 dated Jan. 31, 2023. English translation provided.
Office Action issued in Chinese Appln. No. 202110054097.4 dated Jan. 13, 2023. English machine translation provided.
Office Action issued in European Appln. No. 21151940.0 dated Jan. 31, 2023.
Office Action issued in Australian Appln. No. 2017355673 dated Sep. 21, 2022.
Office Action issued in Canadian Application No. 3,105,086, dated Nov. 14, 2022.

* cited by examiner

FOOTWEAR SOLE, BOOT AND SANDAL

RELATED APPLICATIONS

This application is a Continuation of U.S. patent application Ser. No. 16/745,929, filed Jan. 17, 2020, which is a Continuation-In-Part (CIP) of U.S. patent application Ser. No. 15/803,998, filed on Nov. 6, 2017, now U.S. Pat. No. 10,869,522, issued on Dec. 22, 2020, which, in turn, is a CIP of U.S. patent application Ser. No. 15/343,881, filed on Nov. 4, 2016, now U.S. Pat. No. 10,772,377, issued on Sep. 15, 2020, the contents of both applications being incorporated herein by reference in their entirety.

BACKGROUND

Field

The present invention relates to footwear and, more particularly, to footwear soles, boots and sandals.

Description of the Related Art

Typically, in many types of footwear, the footwear is formed of an outsole (or sole) attached to an upper. The outsole refers to an outer sole of footwear (e.g., a shoe or a boot) that is generally configured to be in contact with the floor, and is used to provide comfort and support for the foot of the wearer, as well as durability of the footwear. To achieve these objectives, the outsole is typically formed of separate components arranged in multiple layers, with each layer addressing a particular need. For example, one component may provide cushioning and comfort to the wearer, while another component may provide stability and durability. Often, the separate components are secured together by adhesive or stitching.

The need to separately form and combine these multiple layers has various disadvantages, such as being time consuming, labor intensive, expensive, and subject to premature failure.

In addition, in the footwear art, it is typically a need to form an item of footwear using multiple pieces of different types of materials. This is because different portions of an item of footwear have different characteristic requirements based on their function. For example the bottom surface of a sole is typically required to be relatively rigid, durable, resilient and able to last while being used on rough and abrasive surfaces such as sidewalks, paved areas, dirt, grass, mud, and other such surfaces. In contrast, the top part of the sole is typically required to be soft, smooth and shape conforming to comfortably accommodate the bottom of a foot of a user or wearer of the footwear item.

Further, the upper of the footwear item is required to be flexible and comfortable, to accommodate the top of a foot of the user or wearer. In the case of a boot, the boot shaft typically should be flexible enough to accommodate the calf of the leg of the user or wearer. Similarly, with sandals, the upper, which sometimes includes straps and a toe post, should be flexible enough to accommodate the top portion of a foot of the user or wearer, while providing enough support so that the sandal can remain on the user or wearer's foot. In addition, there is also a desire for the overall item of footwear to be lightweight.

Due to the above-discussed different requirements of different portions of footwear, it is typically necessary to form a boot or sandal from multiple components, each with its own specific characteristics. The various pieces are then joined together to form a single item of footwear.

A problem with such typical footwear designs, however, is that they are relatively expensive, require the use of multiple components, and require a relatively complex manufacturing process.

In addition, while some footwear items have been made to address this problem, there has not been in the art, a compound that could be used to suitably perform all of the above-discussed characteristics of the different portions of footwear, as the various tradeoffs encountered (i.e., between durability, comfort, resiliency and weight) have not been suitably addressed by a single compound. In addition, this problem can be exaggerated based on the designs of certain types of footwear, such as sandals and boots.

Thus, there is a need in footwear for materials and processes for producing items of footwear soles that are, on the one hand, cost efficient and improve efficiency of manufacture; and on the other hand, provide desired properties to footwear, such as flexibility, reduced weight, comfort, and durability.

BRIEF SUMMARY

Aspects of the present invention address the above-discussed shortcomings in the related art, and other needs.

Some aspects of the invention include a boot including a sole portion, a lower portion, and a boot shaft portion. The sole portion, the lower portion and the boot shaft portion can be formed as a unitary member composed of a single compound, wherein the single compound can include: EVA in the range of 17% to 27%, POE in the range of 6% to 16%, SEBS in the range of 10% to 20%, and rubber in the range of 19% to 29%.

In some aspects of the invention, the sole portion, the lower portion and the boot shaft portion of the boot are formed as a unitary member composed of a single compound that includes EVA in the range of 20% to 24%; POE in the range of 9% to 13%; SEBS in the range of 13% to 17%; and rubber in the range of 22% to 26%. In some aspects of the invention, the single compound includes: EVA 22%; POE 11% SEBS 15%; and rubber 24%. In some aspects of the invention, the rubber is Kraton G. In some aspects of the invention, the single compound further includes a bridging agent in the range of 0% to 2%. In some aspects of the invention, the single compound further includes a foaming agent in the range of 0% to 4%. In some aspects of the invention, the boot is formed by a single shot injection molding process. In some aspects of the invention, the boot is formed by a two step compression molding process.

Some aspects of the invention include a sandal including a sole portion and an upper portion, The sole portion and the upper can be formed as a unitary member composed of a single compound. The wherein the single compound can include: EVA in the range of 17% to 27%, POE in the range of 6% to 16%, SEBS in the range of 10% to 20%, and rubber in the range of 19% to 29%.

In some aspects of the invention, the sole portion and the upper portion are formed as a unitary member composed of a single compound, wherein the single compound includes: EVA in the range of 20% to 24%; POE in the range of 9% to 13%; SEBS in the range of 13% to 17%; and rubber in the range of 22% to 26%. In some aspects of the invention, the single compound includes: EVA 22%; POE 11%; SEBS 15%; and rubber 24%. In some aspects of the invention, the rubber is Kraton G. In some embodiments, the single compound further includes: a bridging agent in the range of 0% to 2%. In some aspects of the invention, the single compound further includes a foaming agent in the range of 0% to 4%. In some aspects of the invention, the sandal is formed by a single shot injection molding process. In some aspects of the invention, the sandal is formed by a two step compression molding process. In some aspects of the invention, the upper portion includes one or more straps. In some aspects of the invention, the upper portion includes a toe post. In some aspects of the invention, the upper portion includes a plurality of apertures.

By way of aspects of the present invention, a footwear item, such as a boot or sandal, is provided that addresses multiple needs, and can reduce costs and complexities in the manufacturing process, while providing comfort, lightness and durability. Other benefits of the present invention are described below.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

In the following description, certain specific details are set forth in order to provide a thorough understanding of various embodiments of the invention. However, one skilled in the art will understand that the invention may be practiced without these details. In other instances, well-known structures have not been shown or described in detail to avoid unnecessarily obscuring descriptions of the embodiments of the invention.

As used herein, the term "footwear item" is a device or item worn on a user's foot, for example, a shoe. Non-limiting examples of footwear may include a slipper, a sock, a ballet slipper, a sport shoe, a sandal, a boot, a dress shoe, and the like. Other examples of footwear items, as are known to those of skill in the art, can also be included.

Herein, "footwear sole" and/or "sole" refers to a unitary sole, an insole, an outsole, and/or any combination thereof, with or without addition of components.

Some embodiments of the present invention relate to footwear, and, more specifically, but not exclusively, to footwear soles, footwear items, boots, sandals, and to methods of manufacturing same.

In accordance with the invention, a footwear sole is in a form of a single unitary layer composed of a composition as described herein. The footwear sole of the invention has improved beneficial features, including, cushioning, flexibility, support, abrasion resistance, compression resistance, waterproofness, and ease of manufacture. Specifically, the footwear sole of this invention, as a single unitary layer, provides the above unique features without requiring combination with additional layers (e.g., insole, outsole, midsole, etc.), the use of multi-piece soles, and/or topical treatments, as typically required in footwear soles.

Aspects of the present invention aims at providing a footwear sole and/or a footwear item, such as a boot or sandal, formed of a combination of materials blended together to provide improved and unique properties, in a cost efficient manner and ease of manufacture. Additionally, the footwear sole and/or footwear item of the present invention aims to eliminate the use of adhesives and other means of adhering sole materials. The footwear sole and/or footwear item can be formed from a unique compound having unique and beneficial qualities.

Herein, "compound", "composition" and "blend" may be used interchangeably, and refer to a combination of components mixed together to provide a material that is used to prepare the footwear sole and/or footwear item of the invention.

The composition of the footwear sole is a blend of (EVA) and rubber. Optionally, additional components may be added, e.g., one or more of a foaming agent, bulking agent, bridging agent, and/or a coloring agent. For instance, a process comprising heating while mixing together the above components to melt followed by molding, may be utilized to obtain the single unitary layer for the footwear sole of the invention. The compound can further include blowing agents and minimal amounts of other agents (e.g., bridging agents and/or bulking agents and/or coloring master agents). The compound can include these various components in specific amounts.

EVA, in typical footwear sole applications, is a component that may provide light weight to a sole, however it has several drawbacks, including, it is generally dense, it is susceptible to compression set, it has limited rebounding capability, it has a decreased abrasion resistance, increased hardness, and brittleness.

Rubber is a component that may provide a sole with desired properties, such as, softness, abrasion resistance, and compression resistance (e.g., when worn repeatedly on a wide range of substrates and under several weight compressions). However, in typical footwear sole applications, the addition of rubber to EVA may result in disadvantages, such as, increased weight, insufficient elasticity, hardness, and rigidity.

Nonetheless, while EVA and/or rubber components may provide some desired footwear sole and/or footwear item properties, the amalgamation of these components may pose manufacturing challenges. For example, in typical proportions used in conventional footwear soles, e.g., when EVA is present in too high percentages, a molded product becomes more dense and of an increased hardness, and thus, making it so rigid that it loses much of its cushioning and rebounding capacity. When EVA is presented in too low amount, dimensional stability issues upon manufacturing results in uncontrollable shrinkage of a manufactured footwear sole end product.

A foaming agent may be utilized to decrease the weight of a footwear sole. Foaming introduces gas into the EVA and/or rubber sole composition. The density of the composition decreases with increased foaming agent content. However, the proportion of EVA and rubber to foaming agent is important because as the foaming agent content increases, Young's modulus decreases in compression, but the likelihood of compression set in the composition increases.

Examples of suitable foaming agents include aliphatic hydrocarbons and their chloro- and fluoro-derivatives, isomers of pentane, hexane, heptane, fluorocarbons, trichlorofluoromethane, dichlorodifluoromethane, dichlorotetrafluoroethane, monochlorodifluoromethane, methylene chloride, carbon dioxide, water, nitrogen, sodium bicarbonate, dinitrosopentamethylene-tetamine, sulfonyl hydroxides, azodicarbonamide, p-toluenesulfonyl semicarbazide, 5-phenyltetrazole, diisopropylhydrzodicarboxylate, or sodium borohydrite.

Bulking agents may include Azodi Carbon Amide ($NH_2CON=NCONH_2$). Bulking agents may also function to perform as the foaming agent.

Some embodiments of some aspects of the invention provide a footwear sole in a form of a single unitary layer composed of a composition comprising: EVA, rubber, and at least one agent selected from a bulking agent and a foaming agent.

In some embodiments, the composition further comprises at least one of a bridging agent and a color master agent.

The bridging agent may function as a binder to bind the components of the composition together. Some non-limiting examples of bridging agents utilized in accordance with the invention include: Dicumyl Perxide ($C_{18}H_{22}O_2$).

Color master agent refers to a carrier for providing colors in the sole and/or footwear items of the invention. Some non-limiting examples of color agents utilized in accordance with the invention include any colorant known in the art.

In some embodiments of the invention, the above components may be combined to form a single homogeneous composition, which may be used to form the sole of the invention to provide a combination of desired properties from a single formulation. In addition, additional footwear components, such as an upper, a boot shaft and/or the like, may be formed from a substantially similar composition.

In some embodiments of the footwear sole and/or footwear item and/or the method aspects of the invention, the composition comprises the component ethyl vinyl acetate (EVA) in (w/w) % in the range of 20% to 60%. In some embodiments, the composition comprises ethyl vinyl acetate (EVA) in the range of 42% to 46%, or 44%, or 57% to 60%, or 59%, or 20% to 22%, or 20%. In some embodiments, the composition comprises ethyl vinyl acetate (EVA) in the range of a lower limit % to an upper limit %. In some embodiments, the lower limit may be selected from any of: 20%, or 21%, or 22%, or 24%, or 25%, or 26%, or 28%, or 30%, or 32%, or 34%, or 36%, or 38%, or 40%, or 42%, or 44%, or 46%, or 48%, or 50%, or 52%, or 54%, or 56%, or 58%; and in some embodiments, the upper limit may be selected from any of: 60%, or 58%, or 56%, or 55%, or 50%, or 50%, or 45%, or 40%, or 35%, or 30%, or 25%, or 24%, or 22%.

Alternatively or additionally, in some embodiments of the footwear soles and/or footwear items and/or the method aspects of the invention, the composition may further comprise rubber in (w/w) % in the range of 25% to 70%. In some embodiments, the composition comprises rubber in the range of 38% to 42%, or 40%, or 28% to 32%, or 30%, or 66% to 70%, or 70%. In some embodiments, the composition comprises rubber in the range of a lower limit % to an upper limit %. In some embodiments, the lower limit may be selected from any of: 25%, or 26%, or 27%, or 28%, or 29%, or 30%, or 32%, or 34%, or 36%, or 38%, or 40%, or 44%, or 46%, or 50%, or 52%, or 54%, or 56%, or 58%, or 60%, or 62%, or 64%, or 66%; and in some embodiments, the upper limit may be selected from any of: 69%, or 66%, or 62%, or 60%, or 55%, or 50%, or 45%, or 42%, or 40%, or 38%.

Alternatively or additionally, in some embodiments of the footwear sole and/or the footwear item, and/or the method aspects of the invention, the composition may yet further comprise bulking agent in (w/w) % in the range of 6% to 12%. In some embodiments, the composition comprises bulking agent in the range of 6% to 12%, or 6% to 8%, or 6%, or 6.2%. In some embodiments, the composition comprises bulking agent in the range of a lower limit % to an upper limit %. In some embodiments, the lower limit may be selected from any of: 6%, or 6.2%, or 7%, or 8%; to an upper limit selected from any of: 12%, or 11%, or 10%, or 9%, or 8%, or 7%.

Alternatively or additionally, in some embodiments of the footwear sole and/or footwear item, and/or the method aspects of the invention, the composition may yet further comprise foaming agent in (w/w) % in the range of 0.5% to 12%. In some embodiments, the composition comprises foaming agent in the range of 6% to 10%, or 8%, or 1% to 5%, or 3%, or 0.5% to 3%, or 0.8%. In some embodiments, the composition comprises foaming agent in the range of a lower limit % to an upper limit %. In some embodiments, the lower limit may be selected from any of: 0.5%, or 0.7%, or 0.8%, or 0.9%, or 1%, or 1.5%, or 2%, or 2.5%, or 3%, or 3.5%; to an upper limit selected from any of: 12%, or 11%, or 10%, or 9%, or 8%, or 7%, or 6%.

Alternatively or additionally, in some embodiments of the footwear sole and/or footwear item, and/or the method aspects of the invention, the composition may yet further comprise bridging agent in (w/w) % in the range of 1% to 5%. In some embodiments, the composition comprises bridging agent in the range of 1% to 3%, or 1% to 2.5%, or 1%. In some embodiments, the composition comprises bridging agent in the range of a lower limit % to an upper limit %. In some embodiments, the lower limit may be selected from any of: 1%, or 1.2%, or 1.4%, or 1.5%, or 1.6%, or 1.8%, or 2%, or 2.2%, or 2.5%; to an upper limit selected from any of: 5%, or 4.5%, or 4%, or 3.5%, or 3%, or 2.5%, or 2.4%, or 2%.

Alternatively or additionally, in some embodiments of the footwear sole and/or the footwear item, and/or the method aspects of the invention, the composition may yet further comprise color master agent in the range of 0% to 2%. In some embodiments, the composition comprises color master agent in the range of 0.5% to 2%, or 1%, or 1% to 2.0%, or 0.5% to 1.5%, or 1.5%. In some embodiments, the composition comprises color master agent in the range of a lower limit % to an upper limit %. In some embodiments, the lower limit may be selected from any of: 0.1%, or 0.2%, or 0.3%, or 0.4%, or 0.5%, or 0.6%, or 0.8%, or 1%, or 1.2%; to an upper limit selected from any of: 2%, or 1.8%, or 1.5%, or 1.3%, or 1.2%, or 1.1%, or 1%.

In some embodiments of the footwear sole and/or footwear item, and/or the method aspects of the invention, the composition comprises the following components in (w/w)
EVA in the range of 20% to 60%;
rubber in the range of 25% to 70%;
bulking agent in the range of 6% to 12%;
foaming agent in the range of 0.5% to 12%;
bridging agent in the range of 1% to 5%; and color master agent in the range of 0% to 2%.

In some embodiments of the footwear sole and/or the footwear item, and/or the method aspects of the invention, the composition comprises:
EVA in the range of 42% to 46%;
rubber in the range of 38% to 42%;
bulking agent in the range of 6% to 8%;
foaming agent in the range of 6% to 10%;
color master agent in the range of 0.5% to 1.5%; and
bridging agent in the range of 1% to 3%.

In some embodiments of the footwear sole and/or the footwear item, and/or the method aspects of the invention, the composition comprises:
44% EVA;
40% rubber;
6% bulking agent;
8% foaming agent;
1% color master agent; and
1% bridging agent.

In some embodiments of the footwear sole and/or footwear item, and/or the method aspects of the invention, the composition comprises:
ethyl vinyl acetate (EVA) in the range of 57% to 60%;
rubber in the range of 28% to 32%;
bulking agent in the range of 6% to 8%;
foaming agent in the range of 1% to 5%;
color master agent in the range of 0.5% to 2%; and
bridging agent in the range of 1% to 2.5%.

In some embodiments of the footwear sole and/or the footwear item, and/or the method aspects of the invention, the composition comprises:
59% EVA;
30% rubber;
6% bulking agent;
3% foaming agent;
1% color master agent; and
1% bridging agent.

In some embodiments of the footwear sole and/or the footwear item, and/or the method aspects of the invention, the composition comprises:
EVA in the range of 20% to 22%;
rubber in the range of 66% to 70%;
bulking agent in the range of 6% to 8%;
foaming agent in the range of 0.5% to 3%;
color master agent in the range of 0.5% to 2%; and
bridging agent in the range of 1% to 2.5%.

In some embodiments of the footwear sole and/or the footwear item, and/or the method aspects of the invention, the composition comprises:
20% ethyl vinyl acetate (EVA);
70% rubber;
6.2% bulking agent;
0.8% foaming agent;
1.5% color master agent; and
1.5% bridging agent.

In some embodiments of the footwear sole and/or the footwear item, product and/or the method aspects of the invention, the composition consisting essentially of:
EVA in the range of 20% to 60%;
rubber in the range of 25% to 70%;
bulking agent in the range of 6% to 12%;
foaming agent in the range of 0.5% to 12%;
color master agent in the range of 0% to 2%; and
bridging agent in the range of 1% to 5%.

The footwear soles and/or the footwear items, composed of a single layer of the composition described herein, are characterized by unique and improved properties. For example, footwear sole and footwear item of the invention has a stable cushioning property measured as compression set. According to some embodiments of the invention, the compression set value is not more than 30%, thus, bubbles (foamed cells) in the footwear sole are restored to original state every time they are subject to impact compression due to weight imposed by the wearer (for example, during walking, running and/or the like), and a stable cushioning property of the sole is maintained.

Some embodiments of some aspects of the invention provide a footwear sole and/or a footwear item characterized by having at least one property selected from:
Skid resistance of dry in the range of u 0.30 to u 0.80, and wet in the range of u 0.35 to u 0.60 (e.g., when worn on a wet surface and dry surface), determined according to F2913-2011;
Shore A hardness in the range of 20H to 35H, determined according to ASTM D2240, in some embodiments 23H to 30H, or 25H to 30H, or 25H to 28H;
Shore C hardness in the range of 35H to 48H, determined according to ASTM D2240, in some embodiments 35H to 45H, or 40H to 43H;
Compression set of not more than 30%, determined according to SATRA TM156:2002,620n. In some embodiments, the compression set is not more than 20%. In some embodiments, the compression set is in the range of 4 to 25%, or 6 to 20%, or 8 to 18%, or 4 to 18% or at most 15%, or at most 12%.
Density in the range of 0.2 to 0.7 mg per cubic meter (mg/m$^3$), determined according to ASTM D297. In some embodiments, the density is in the range of 0.24 to 0.6 mg/m$^3$, or 0.25 to 0.52 mg/m$^3$, or 0.272 to 0.489 mg/m$^3$, or 0.3 to 0.45 mg/m$^3$, or 0.25 to 0.35 mg/m$^3$, or 0.25 to 0.30 mg/m$^3$.
Abrasion resistance in the range of about 0.1 to about 0.5 g after 10,000 cycles, determined according to ASTM D3886-99. In some embodiments, the abrasion resistance in the range of about 0.2 to about 0.5 g after 10,000 cycles, or about 0.2 to about 0.4 g, or about 0.1 to about 0.5 g.

Some embodiments of some aspects of the invention provide a method of preparing a footwear sole composed of a single unitary layer. In some embodiments, the method comprises a step of forming, by mixing while heating, a molten composition comprising: ethyl vinyl acetate (EVA), rubber, and at least one agent selected from a bulking agent and a foaming agent. In some embodiments, the constituent components of the desired compositions (e.g., EVA, rubber, foaming agent, bridging agent, and color) are blended together to create a mixture of homogenous pellets, granules, or both, e.g., the components are mixed and melted to form a uniform blend of the various components.

The forming of a molten composition may be carried out at a temperature in the range of 70 to 110° C., or 75 to 100° C., or 80 to 110° C., or 90 to 100° C., or 90 to 95° C., or 85 to 95° C., to provide a homogeneous composition.

Foaming agent and/or a bulking agent may be utilized to decrease the weight of a sole component. Foaming may be utilized to introduce gas into the sole composition during the process of the invention. In some embodiments, foaming may be used to decrease the weight of the composition while allowing for filling of the mold with a required volume of molten composition with less dense solid matter.

Thus, the footwear sole and/or the footwear item may be manufactured in a single-step process (e.g., single-shot molding). A single step process is advantageous since it allows a more efficient manufacturing process as the composition is subjected to a single heating process, thus enabling shrinkage management. Multiple reheating may cause the composition to become unstable and thus managing shrinkage on the end product sole may be more challenging.

In some embodiments, the method comprises one or more of: injection molding, compression molding and single-step molding.

After the molten composition forming step, the molten composition is inserted in to a mold (e.g., by injecting the molten composition into a two part mold at the temperature range) and heated to a temperature in the range of 130 to 190° C.; to form and optionally cure the footwear sole and/or the footwear item. In some embodiments of the method of the invention, the molding step is carried out at a temperature in the range of 140 to 190° C., or 150 to 190° C., or 160 to 185° C., or 170 to 180° C.

After the molding step, the mold is cooled to a temperature in the range of 130 to 160° C., or 135 to 150° C., or 140 to 145° C., to form a footwear sole and/or footwear item.

The formed footwear sole and/or footwear item is then removed from the mold, e.g., after cooling the mold to about 25 to 40° C., or 25 to 30° C., e.g., for a duration of time in the range of 5 to 30 minutes, or 5 to 15 minutes.

Molding and/or curing cycle times of the invention can exceed 10 minutes, or 15 minutes, or 20 minutes, which is advantageous in comparison to typical footwear sole and/or footwear sole manufacturing process cycle times of under 2 minutes, since the exceeded time duration allows for obtaining advantageous thicknesses in a continuous and single step process. In some embodiments, the sole forming step comprises forming a cross-linked foamed sole, by foaming while curing the molten composition in the mold.

In some embodiments of the method of the invention, the molding step is carried out simultaneously during the curing and/or the foaming process steps to allow the molten composition to expand and/or cure simultaneously during the molding and then be removed from the mold, e.g., by utilizing a suitable curing agent and/or foaming agent, heating temperature range, time duration, pressure, cooling temperature range, etc. This is advantageous since the composition and/or method of the invention, provide a single sole (and/or outsole and/or footwear item) that provides a combination of unique features described herein.

In some embodiments, the method further comprising a two-step cooling step after the molding step, wherein the first cooling is to a temperature in the range of 130 to 160. degree. C. for a duration of time in the range of 5 to 20 minutes, and the second cooling is to about room temperature for a duration of time in the range of 5 to 30 minutes.

The footwear sole and/or footwear item is characterized by having a thickness in the range of 15 to 40 mm, or 17 to 35 mm, or 20 to 30 mm, or 18 to 28 mm, which is provided due to the composition and/or the method of the invention.

Next, the footwear sole is further shaped with a shoe last to form the sole. In some embodiments, a cover mold is used for application of flock. A primer, and then optionally glue are sprayed on a bottom of the sole using the cover mold. Flock is then dusted onto the glue.

Finally, the excess flock is removed from the glued surfaces.

The method steps may be performed in a different order. In some embodiments, some steps are excluded, and/or some steps are performed multiple times.

The sole formed from this unique and inventive method has properties not found in other footwear soles. Specifically, a sole 100 formed from this unique and inventive rubber compound, that includes a combination of EVA and rubber can provide a softness and rebound (e.g., retention of original shape of the sole after repeated compression). In addition increased flexibility, compression resistance, light weight and durability are provided.

In some embodiments, the sole obtained from the above method is generally homogeneous, e.g., the sole, boot, or sandal is formed from a uniform blend of the various components in the composition.

In some embodiments of the footwear sole and/or footwear item and/or method aspects of the invention, the thickness of the layer obtained is in the range of 10 to 50 mm, or 15 to 35 mm, or 18 to 35 mm, or 18 to 29 mm.

Reference is now made to FIGS. 1-4, which depict various views of a footwear sole 100, according to some embodiments of the invention.

Figure 1:
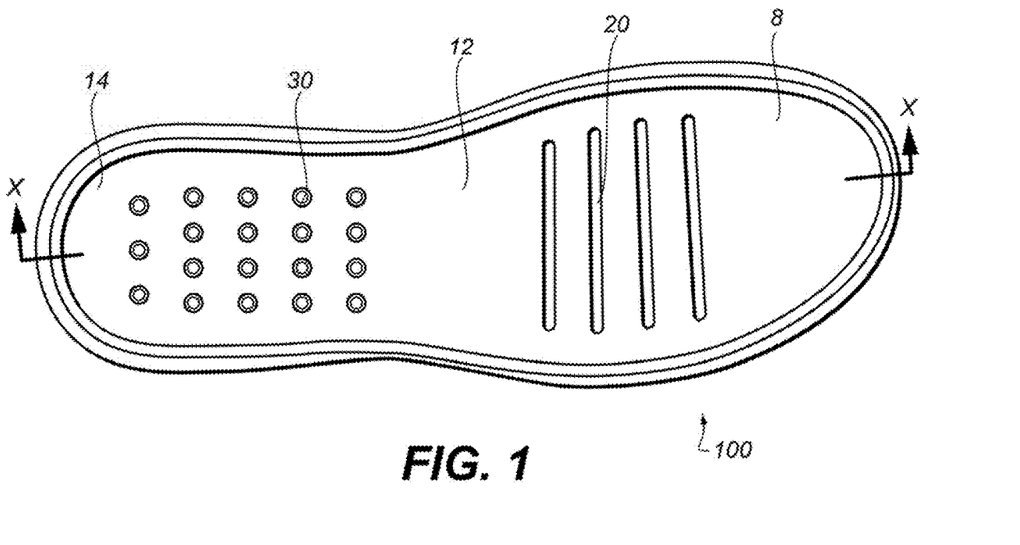
FIG. 1 is a top view of an exemplary footwear sole, in accordance with some embodiments of the invention.

FIG. 1 shows a top view of a footwear sole 100, in accordance with embodiments of the invention. As used herein, the term "footwear" means a device or item worn on a user's foot, for example, a shoe. Non-limiting examples of footwear may include a slipper, a sock, a ballet slipper, a sport shoe, a sandal, a boot, a dress shoe, and the like. Other examples of footwear, as are known to those of skill in the art, can also be included.

As used herein, the term "sole" can be a unitary sole, an insole, outsole, or any combination thereof, with or without additional components added.

Sole 100 is formed of a sole compound that is described in further detail below. In some embodiments, Sole 100 includes a top surface 8 including a front portion 10, a middle portion 12, and a rear portion 14. The front portion 10 is proximate the area where a wearer's toes would be located, the rear portion 14 is proximate the area where a wearer's heel would be located, and the middle portion 12 is located between the front portion 10 and rear portion 14. In some embodiments, grooves 20 are disposed in top surface 8 of the front portion 10 of sole 100. In some embodiments, grooves 20 can be arranged in a substantially parallel arrangement, extending away from one side of the sole 100, towards the other side. In some embodiments, sole 100 can include four grooves 20. In some embodiments, other arrangements of grooves 20 can be used. In some embodiments, sole 100 does not include any grooves 20.

Apertures 30 are also defined in top surface 8 of sole 100. Apertures 30 can allow for sole 100 to be lighter, while also providing some cushioning benefits. Apertures 30 can be arranged in rows. In some embodiments, sole 100 includes rows of apertures 30. Each row can include three or four apertures 30. Additionally or alternatively, in some embodiments, different configurations of apertures 30 can be used. In some embodiments, no apertures 30 are defined in sole 100.

In some embodiments, the footwear sole comprises a top surface, the top surface including a plurality of apertures defined in a rear portion of the top surface. In some embodiments, the plurality of apertures are defined in a tapered shape, and a first aperture of the plurality of apertures has a depth that is less than a second aperture of the plurality of apertures.

Figure 2:
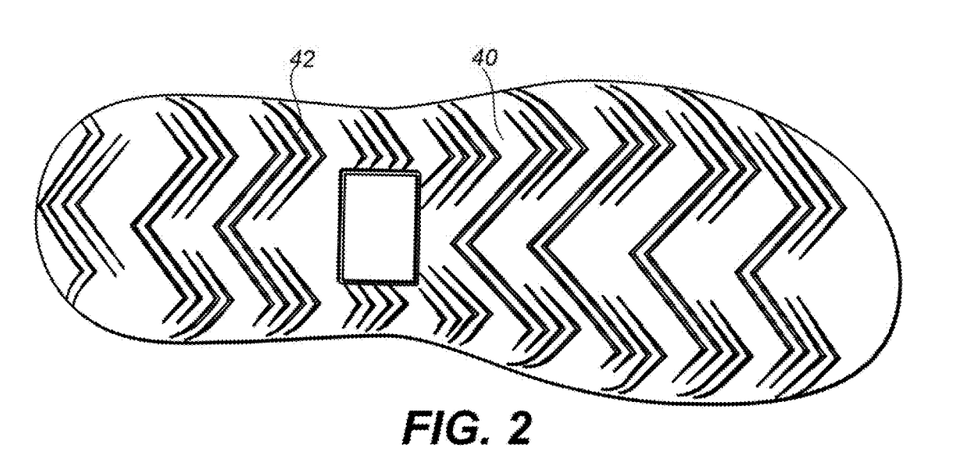
FIG. 2 is a bottom view of the footwear sole of FIG. 1.

FIG. 2 shows a bottom view of a footwear sole 100. In some embodiments, recessed grooves 42 are defined in a bottom surface 40 of sole 100. Recessed grooves 42 can provide traction while walking on smooth or wet surfaces. Recessed grooves 42 can be formed in a chevron or zig-zag pattern. Alternatively, other patterns can also be used. The grooves 42 can end with the recess raising to the bottom surface 40. Sole 100 can include a sidewall that extends beyond a walking surface of bottom surface 40. Additionally or alternatively, in some embodiments, different configurations of grooves 42 can be used. Additionally or alternatively, in some embodiments, no grooves 42 are defined in bottom surface 40 sole 100.

Additionally or alternatively, in some embodiments, the top surface 8 of the sole 100 further including a plurality of grooves defined in a front portion 10 of the top surface 8.

Additionally or alternatively, in some embodiments, the footwear sole 100 comprising a bottom surface 40, including a plurality of recessed grooves defined therein.

In some embodiments, the sole 100 integrally comprises one or more of an arrangement of grooves, recessed grooves apertures and protrusions within the sole layer 100.

Figure 3:
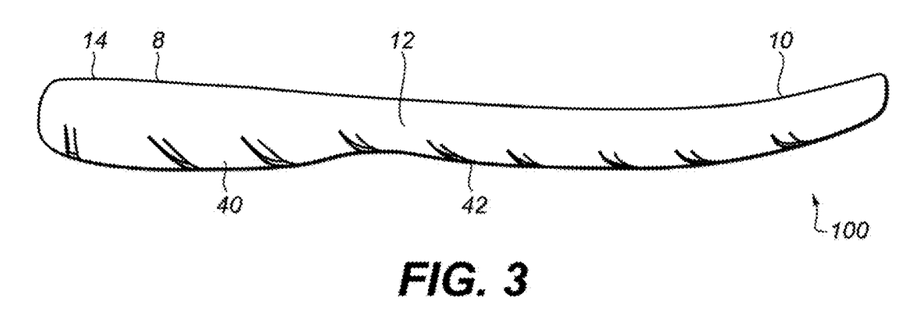
FIG. 3 is a side view of the footwear sole of FIG. 1.

FIG. 3 shows a side view of a footwear sole 100. In some embodiments, grooves 42 can extend to an outer edge of sole 100. The grooves 42 can end with the recess, raising to the surface of the edge of sole 100.

Figure 4:
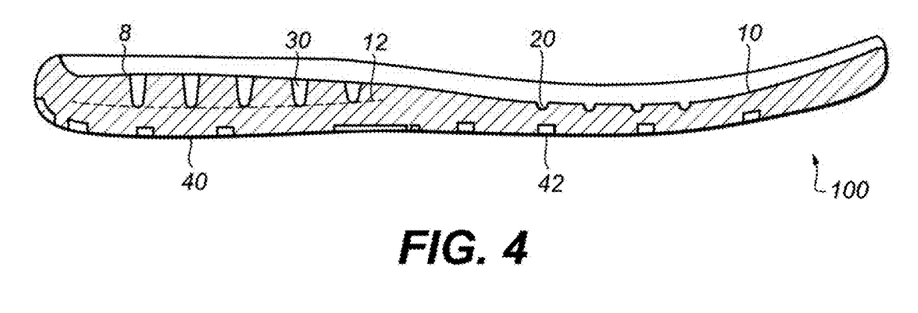
FIG. 4 is a longitudinal cross-sectional view with respect to the X-X axis, of the footwear sole of FIG. 1.

FIG. 4 shows a cross-sectional view of sole 100 taken along line X-X of FIG. 1. Apertures 30 can include a tapered shape, with different apertures 30 having different depths. In some embodiments, the apertures 30 can all have the same depth. Additionally or alternatively, in some embodiments, different arrangements of apertures 30, or no apertures 30, can be used.

While the sole 100 has been described herein as including certain features, such as, by way of non-limiting example, grooves 20, apertures 30 and/or recessed grooves 42, embodiments of the invention can be directed to a sole 100 that does not include one or more of these and other described features, or other combinations of these features. Further, some embodiments, sole 100 can include other features, not described herein.

Figure 5:
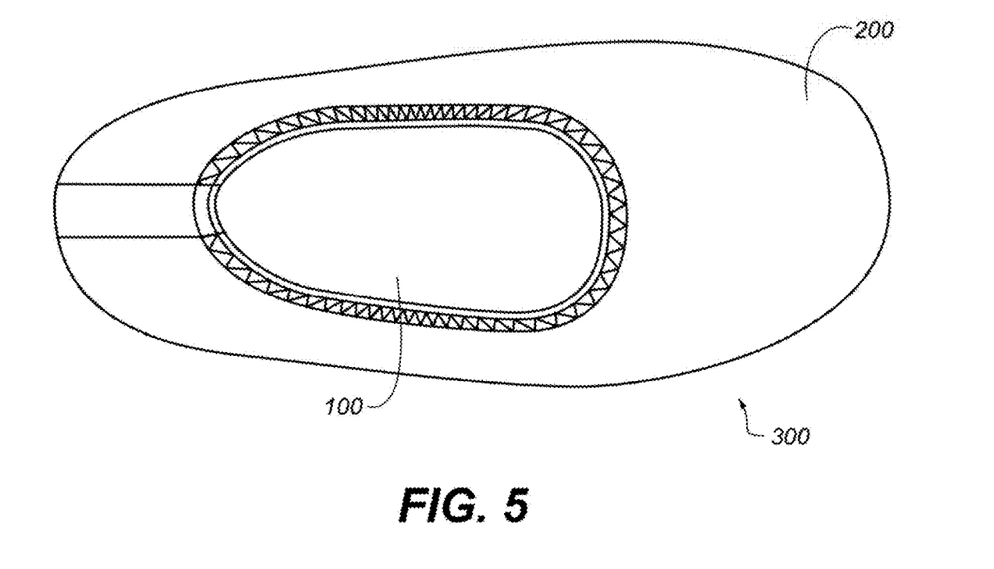
FIG. 5 is an illustration of a footwear item including an upper and a footwear sole, in accordance with some embodiments of the invention.
Figure 6:
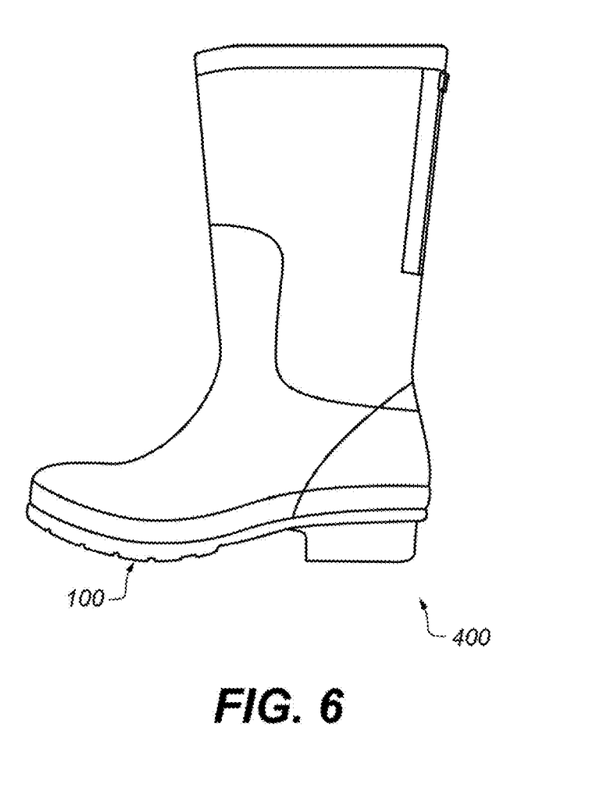
FIG. 6 is another illustration of a footwear item including an upper and a footwear sole, in accordance with some embodiments of the invention.
Figure 7:
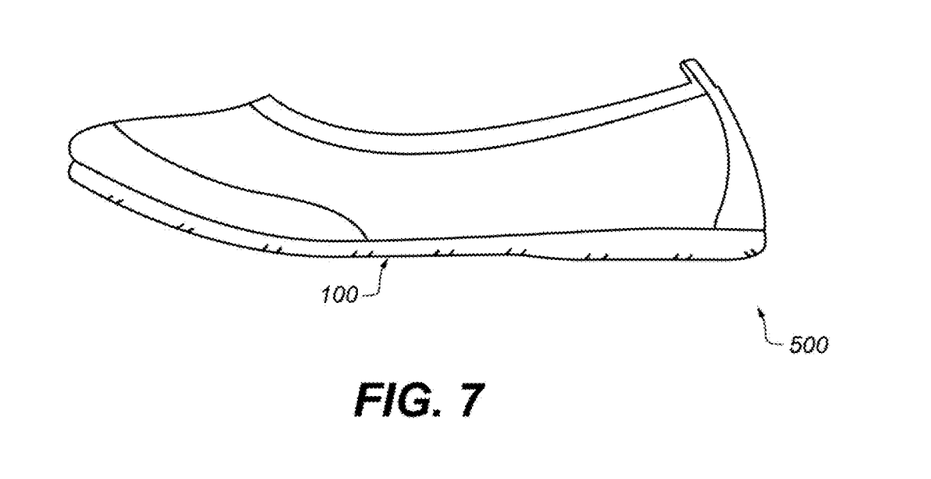
FIG. 7 is an additional illustration of a footwear item including an upper and a footwear sole, in accordance with some embodiments of the invention.

FIG. 5 shows a view of a footwear item 300, including a sole 100 and an upper 200. With footwear item 300, sole 100 is attached to upper 200 in a manner known to those of skill in the art. By way of certain embodiments, footwear item 300 can take various forms, such as that of a slipper, a sandal, a boot, as well as other forms. FIG. 6 shows a view of a footwear item 400, including a sole 100. Footwear item 400 can be, for example, a boot. In some embodiments, a boot, such as a waterproof rain boot (or other type of boot) can be formed substantially entirely from the above-described sole compound. Additionally or alternatively, in some embodiments, a rain boot sole and upper could be formed with other portions of the boot, such as a boot shaft or zipper being added to the portions formed with the sole compound. The other portions may be made from materials other than the sole compound. FIG. 7 shows a view of a footwear item 500, including a sole 100. An upper can be attached to sole 100. Footwear item 500 can be, for example, a ballet slipper.

Further, by forming the sole 100 as a single layer, sole 100 can deliver cushioning and support similar to that delivered by the use of multiple layers/densities of various cushioning materials, as is typical in current footwear soles and/or products. The present inventive sole 100 also eliminates the need for a separate outsole as well. This feature contributes to reduced costs and complexities in the manufacturing process. In addition, a sole formed with the above-discussed compound is lightweight, which is beneficial to the wearer. The sole 100 can also be waterproof.

In some embodiments, a separate top member is disposed on the top surface 10 of the sole 100. Some examples of such materials having elastic and/or rebounding properties include: silicon, polyester, neoprene, natural rubber foams, synthetic rubber foams, polyurethane, polyether and polyester foams, styrene-butadiene rubber (SBR), polyethylene (PE), EVA, as well as other cushioning materials known or used by one skilled in the art, such as memory foam. Additionally or alternatively, the top element may comprise a layer of natural materials, such as leather, cotton, felt, linen, and other such materials known to one skilled in the art.

Additionally or alternatively, in some embodiments, a separate cover layer can cover all or a portion of the sole 100. In some embodiments, the cover layer can be formed of a fabric.

In some embodiments, a footwear item, including sole and upper portions, can be formed from the sole compound in, for example, a single-shot molding process. For example, a waterproof rain boot (or any other type of boot) could be formed substantially entirely from the sole compound. Additionally or alternatively, in some embodiments, a rain boot sole and upper could be formed with other portions of the boot, such as a boot shaft or zipper being added to the portions formed with the sole compound.

In some embodiments, the footwear item can be a slipper, ballet slipper, or other form of footwear item.

In addition, due, in part, to the combination of EVA and blowing agent in the above-discussed rubber compound provides for a light weight sole 100, while still allowing for forming the sole in a mold. The sole 100 is durable, in part, due to the characteristics of the rubber contribute to cushioning and durability. Thus, a sole 100 as described herein is light comfortable and durable.

Figure 8:
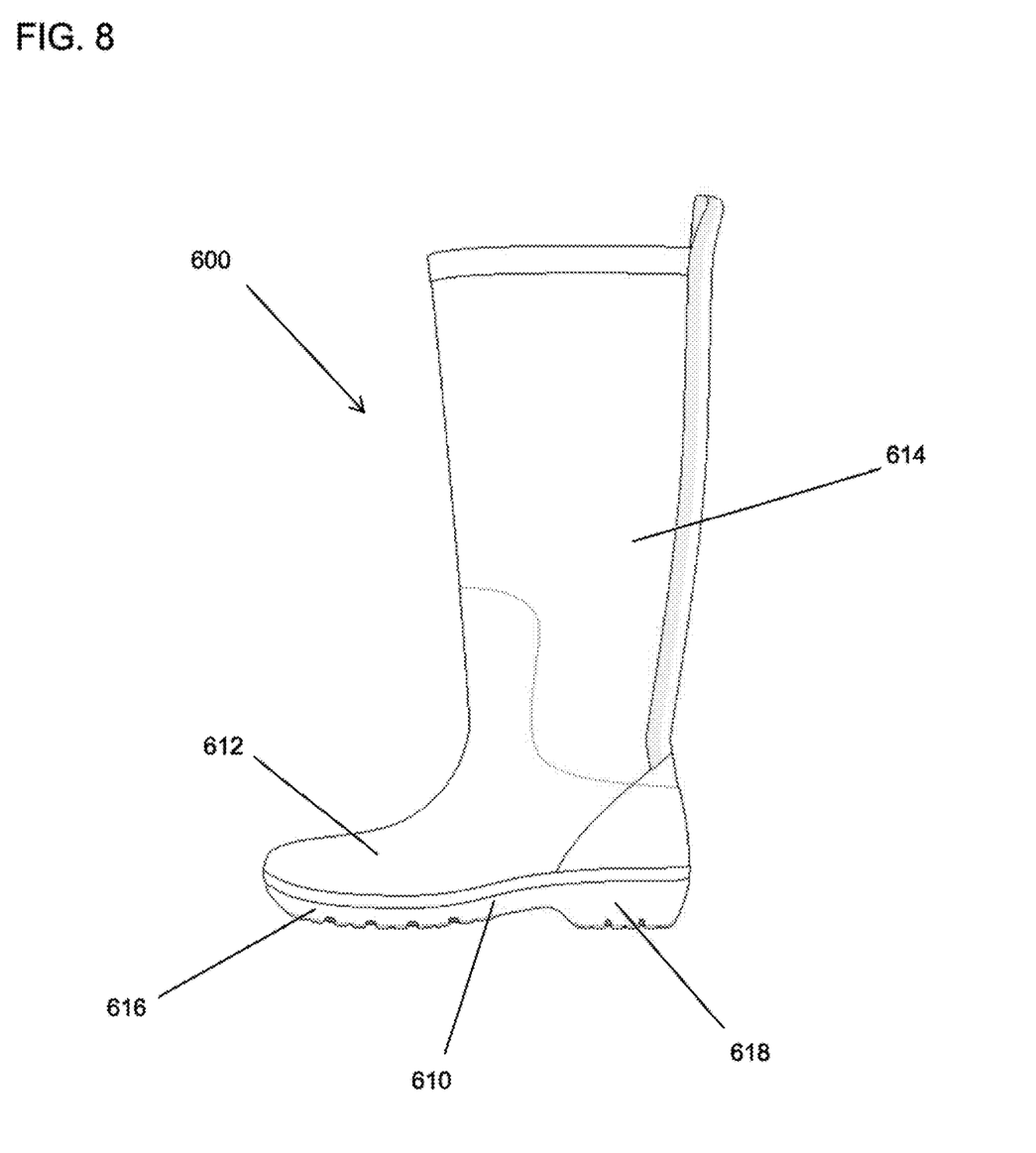
FIG. 8 is a side view of a boot, in accordance with an embodiment of the invention.

FIG. 8 shows a boot 600, including a sole portion 610, lower portion 612 and shaft portion 614. Sole portion 610 includes a front portion 616 and back portion 618. Sole portion 610 includes a top surface (not shown), that contacts a user's foot, and a bottom surface that contacts the ground or floor. The lower portion 612, as is known in the art, covers the top, sides and bottom of a foot of a user. The shaft portion 614 extends above a user's ankle, may cover all or part of the user's calf of the leg. Importantly, in this embodiment, the sole portion 610, lower portion 612 and shaft portion 614 are all formed of the same material or compound, as discussed in further detail below. The boot 600 can be formed via a single shot injection molding process. Alternatively, all of the portions of a boot can be formed from a single material, by way of a two step compression molding process.

Figure 9A:
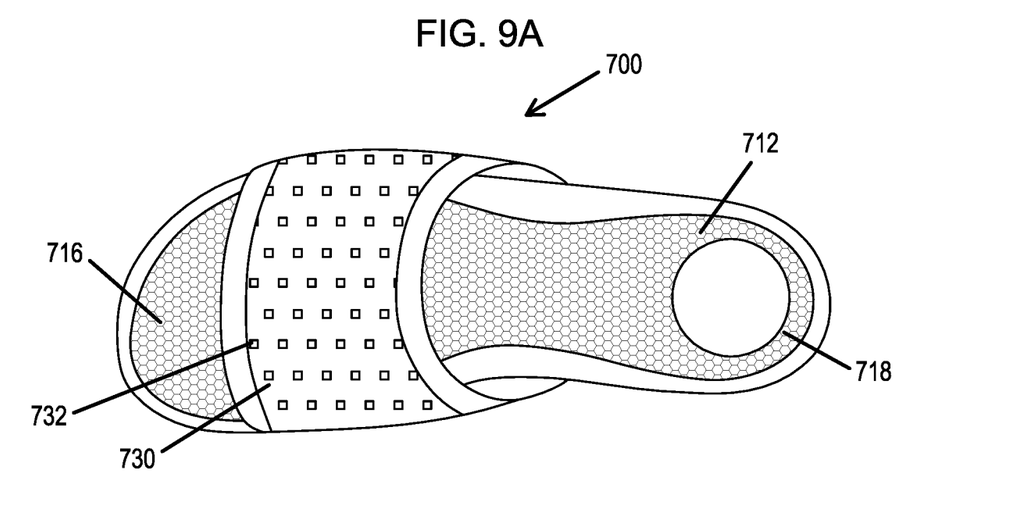
FIGS. 9A and 9B are top and side views, respectfully, of a sandal, in accordance with an embodiment of the invention.
Figure 9B:
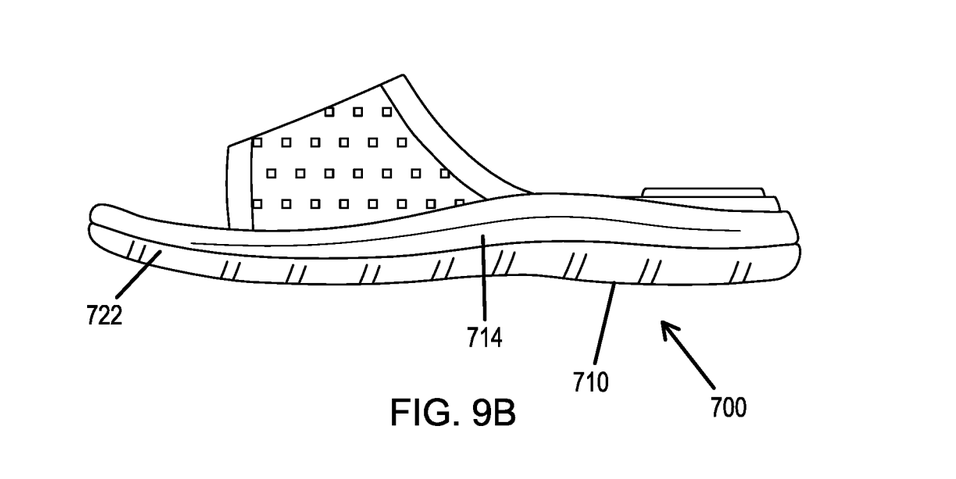

FIGS. 9A and 9B show a sandal 700, including a sole portion 712 and an upper portion 730. Sole portion 712 includes a front portion 716 and a back portion 718. Sole portion 712 includes a top portion 714 and a bottom portion 722. Sole portion 712 also includes a top surface, that contacts a user's foot, and a bottom surface 710 that contacts the ground or floor. As is known in the art, the upper portion 730 wraps around and over various portions of the foot, while leaving other portions of the foot exposed. In some embodiments, upper portion 730 may include holes or apertures 732, to facilitate ventilation and provide a beneficial aesthetic appearance. Importantly, in this embodiment, the sole portion 712 and upper portion 730 are both formed of the same material, as discussed in further detail below.

The sandal 700 is formed via a single shot injection molding process. Alternatively, all of the portions of a sandal can be formed from a single material, by way of a two step compression molding process.

Figure 10A:
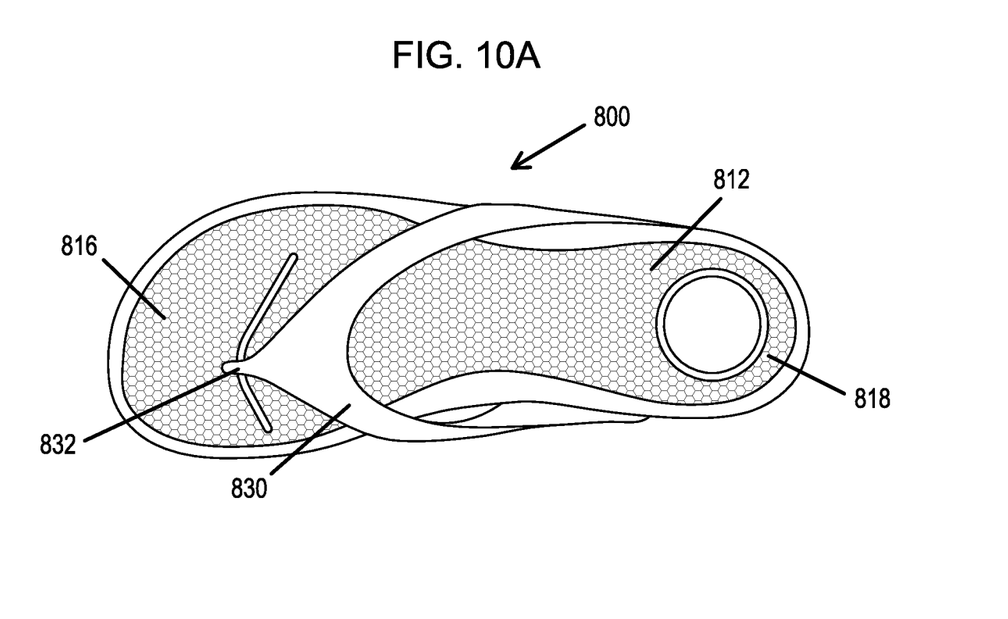
FIGS. 10A and 10B are top and side views, respectfully, of a different sandal, in accordance with an embodiment of the invention.
Figure 10B:
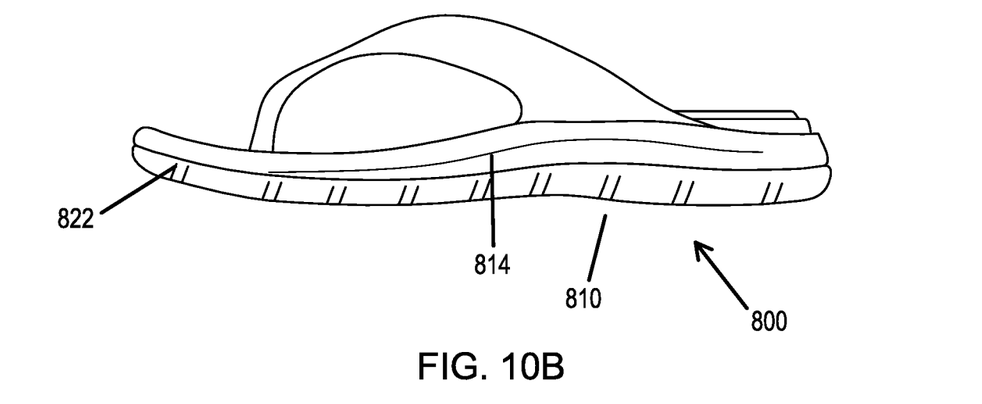

FIGS. 10A and 10B show another embodiment of a sandal 800, including a sole portion 812 and an upper (strap) portion 830. Sole portion 812 includes a front portion 816 and a back portion 818. Sole portion 812 includes a top portion 814 and a bottom portion 822. Sole portion 812 also includes a top surface, that contacts a user's foot, and a bottom surface 810 that contacts the ground or floor. As is known in the art, the upper portion 830 wraps around and over various portions of the foot, while leaving other portions of the foot exposed. In some embodiments, upper portion 830 may include straps and a toe post 832. Importantly, in this embodiment, the sole portion 812 and upper (strap) portion 830 are both formed of the same material, as discussed in further detail below. The sandal 800 is formed via a single shot injection molding process. Alternatively, all of the portions of a sandal can be formed from a single material, by way of a two step compression molding process.

With further reference to FIGS. 8, 9A, 9B, 10A and 10B, importantly, as discussed above, the boot 600, sandal 700 and sandal 800 are formed from the same single material or compound. Specifically, the inventor has discovered a new and beneficial material that yields unexpected results and can provide the rigidity and wear resistance needed for the bottom portion of a sole, while providing the cushioning and comfort for a user's foot at the top portion of the sole. Further, the same material can provide for fit, comfort and structural support for the lower portion and shaft portion of a boot. In addition, the same material can provide for fit, comfort and structural support for the upper portion of a sandal. Thus, by way of using the inventive material of the present invention, all of the portions of a boot can be formed from a single material, by way of a single shot injection molding process. Alternatively, all of the portions of a boot can be formed from a single material, by way of a two step compression molding process. Similarly, by way of using the inventive material of the present invention, all of the portions of a sandal can be formed from a single material, by way of a single shot injection molding process. Alternatively, all of the portions of a sandal can be formed from a single material, by way of a two step compression molding process.

Table 1, shown below, describes ingredients included in a sample batch of material used to form a sandal or a boot, in accordance with certain embodiments of the invention. The table shows the names of the different ingredients, and the weight (kg) of each ingredient, and the total weight (kg) of sample batch. Also included are the percentages of certain ingredients that can be calculated by dividing the weight (kg) of the relevant ingredient by the total weight (kg) of the sample batch. Also, as is known in the art, when weights are discussed in terms of kilograms, technically, the referred to unit being measured is kgf or kilogram-force.

In Table 1, shown below, SEBS is Styrene Ethylene Butylene Styrene. The Rubber is Kraton G. Kraton polymers are styrenic block copolymer (SBC) consisting of polystyrene blocks and rubber blocks. Kraton (TM) is the trade name given to a number of high performance elastomers manufactured by Kraton Polymers (TM). Kraton G is a specific type of TPE (Thermoplastic elastomer), and is derived from the base of SEBS. As used herein with respect to at least the embodiments shown in FIGS. 8, 9A, 9B, 10A and 10B, the term "rubber" has the meaning of Kraton G.

EVA is ethyl vinyl acetate, such as that made by Dow (TM). The POE is Polyolefin elastomer. Further, the AC foaming can be, for example, azodicarbonamide. In addition, the BIBP can be Bis(t-butylperoxy isopropyl) benzene.

TABLE 1

| Ingredient | Description | KG | Percentage of total KG |
|---|---|---|---|
| SEBS | Polymer | 17 | 15 |
| Base oil | soften agent | 11 | |
| Rubber (Kraton G) | polymer | 27 | 24 |
| POE | polymer | 12 | 11 |
| EVA | polymer | 25 | 22 |
| Talcum | filler | 8 | |
| Titanium Oxide | pigment | 4 | |
| Color 1 | Pigment (color master agent) | 5.44 | 4.76 |
| Color 2 | Pigment (color master agent) | 0.053 | 0.05 |
| Zinc Oxide | Activator | 1.3 | |
| Stearic acid | process aid agent | 0.6 | |
| Znic Stearate | process aid agent | 0.4 | |
| AC | foaming agent | 1.8 | 2 |
| BIBP | cross link (bridging) agent | 0.65 | 1 |
| Total | | 114.243 | |

In some embodiments, a boot comprises a sole portion; a lower portion; and a boot shaft portion, wherein the sole portion, the lower portion and the boot shaft portion are formed as a unitary member composed of a single compound, and wherein the single compound includes: EVA in the range of 17% to 27%; POE in the range of 6% to 16%; SEBS in the range of 10% to 20%; and rubber in the range of 19% to 29%.

It is to be understood that the recited substances and percentages of substances are for the subject single compound that the boot is comprised of, and that additional substances that are not explicitly recited can also be included in the compound.

In some embodiments, the sole portion, the lower portion and the boot shaft portion of the boot are formed as a unitary member composed of a single compound that includes EVA in the range of 20% to 24%; POE in the range of 9% to 13%; SEBS in the range of 13% to 17%; and rubber in the range of 22% to 26%. In some embodiments, the single compound includes: EVA 22%; POE 11% SEBS 15%; and rubber 24%. In some embodiments of the boot, the rubber is Kraton G. In some embodiments, the single compound further includes a bridging agent in the range of 0% to 2%. In some embodiments, the single compound further includes a foaming agent in the range of 0% to 4%. In some embodiments, the boot is formed by a single shot injection molding process. In some embodiments, the boot is formed by a two step compression molding process.

In some embodiments, a boot may be manufactured by processes and methods described with respect to other embodiments discussed above. In some embodiments, a boot can share certain characteristics described with respect to other embodiments discussed above.

In some embodiments, a sandal comprises a sole portion; and an upper portion, wherein the sole portion and the upper portion are formed as a unitary member composed of a single compound, and wherein the single compound includes: EVA in the range of 17% to 27%; POE in the range of 6% to 16%; SEBS in the range of 10% to 20%; and rubber in the range of 19% to 29%.

In some embodiments, the sole portion and the upper portion are formed as a unitary member composed of a single compound, wherein the single compound includes: EVA in the range of 20% to 24%; POE in the range of 9% to 13%; SEBS in the range of 13% to 17%; and rubber in the range of 22% to 26%. In some embodiments, the single compound includes: EVA 22%; POE 11%; SEBS 15%; and rubber 24%. In some embodiments, the rubber is Kraton G. In some embodiments, the single compound further includes: a bridging agent in the range of 0% to 2%. In some embodiments, the single compound further includes a foaming agent in the range of 0% to 4%. In some embodiments, the sandal is formed by a single shot injection molding process. In some embodiments, the sandal is formed by a two step compression molding process. In some embodiments, the upper portion includes one or more straps. In some embodiments, the upper portion includes a toe post. In some embodiments, the upper portion includes a plurality of apertures.

The sandal and boot of the invention each have improved beneficial features, including, cushioning, flexibility, support, abrasion resistance, compression resistance, waterproofness, and ease of manufacture. Specifically, each of the sandal and boot of this invention, by being formed as a unitary member composed of a single compound, and provide the above unique features without requiring the forming of multiple components from different substances, and the assembly of those components. The relative amounts of the various substances used were found to provide unexpected beneficial results, and the described relative amounts of substances were determined to be critical to such beneficial results.

It is to be understood that the recited substances and percentages of substances are for the subject single compound that the sandal is comprised of, and that additional substances that are not explicitly recited can also be included in the compound.

In some embodiments, a sandal may be manufactured by processes and methods described with respect to other embodiments discussed above. In some embodiments, a sandal can share certain characteristics described with respect to other embodiments discussed above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A boot, comprising:
    a sole portion;
    a lower portion; and
    a boot shaft portion,
    wherein the sole portion, the lower portion and the boot shaft portion are formed as a unitary member composed of a single compound, and
    wherein the single compound includes:
    styrene ethylene butylene styrene block copolymer (SEBS),
    ethyl vinyl acetate copolymer (EVA) in the range of 17% to 27% by weight; and
    polyolefin elastomer (POE) in the range of 6% to 16% by weight,
    wherein the single compound additionally comprises a rubber which is a styrenic block copolymer (SBC) consisting of polystyrene blocks and rubber blocks, and
    wherein the boot has at least one of the following:
    (i) a dry skid resistance in the range of u 0.30 to u 0.80, and wet skid resistance in the range of u 0.35 to u 0.60, determined according to F2913-2011,
    (ii) a Shore A hardness in the range of 20H to 35H and a Shore C hardness in the range of 35H to 48H, determined according to ASTM 02240,
    (iii) a compression set of not more than 30%, determined according to SATRA TM156:2002,620n,
    (iv) a density in the range of 0.2 to 0.7 mg per cubic meter (mg m$^3$), determined according to ASTM D297,
    (v) an abrasion resistance in the range of about 0.1 to about 0.5 g after 10,000 cycles, determined according to ASTM D3886-99.

2. The boot of claim 1, wherein the single compound includes:
    EVA in the range of 20% to 24% by weight; and
    POE in the range of 9% to 13% by weight.

3. The boot of claim 2, wherein the single compound includes:
    EVA 22% by weight; and
    POE 11% by weight.

4. The boot of claim 1, wherein the single compound further includes:
    a bridging agent in the range of 0% to 2 by weight %.

5. The boot of claim 4, wherein the single compound further includes a foaming agent in the range of 0% to 4% by weight.

6. The boot of claim 1, wherein the boot is formed by a single shot injection molding process.

7. The boot of claim 1, wherein the boot is formed by a two step compression molding process.

8. The boot of claim 1, which has a dry skid resistance in the range of u 0.30 to u 0.80, and wet skid resistance in the range of u 0.35 to u 0.60, determined according to F2913-2011.

9. The boot of claim 1, which has a Shore A hardness in the range of 20H to 35H and a Shore C hardness in the range of 35H to 48H, determined according to ASTM D2240.

10. The boot of claim 1, which has a compression set of not more than 30%, determined according to SATRA TM156:2002,620n.

11. The boot of claim 1, which has a density in the range of 0.2 to 0.7 mg per cubic meter (mg/m$^3$), determined according to ASTM 0297.

12. The boot of claim 1; which has an abrasion resistance in the range of about 0.1 to about 0.5 g after 10; 000 cycles, determined according to ASTM D3886-99.

13. A sandal, comprising:
    a sole portion; and
    an upper portion,
    wherein the sole portion and the upper portion are formed as a unitary member composed of a single compound, and
    wherein the single compound includes:
    styrene ethylene butylene styrene block copolymer (SEBS),
    ethyl vinyl acetate copolymer (EVA) in the range of 17% to 27% by weight; and
    polyolefin elastomer (POE) in the range of 6% to 16% by weight,
    wherein the single compound additionally comprises a rubber which is a styrenic block copolymer (SBC) consisting of polystyrene blocks and rubber blocks, and
    wherein the sandal has at least one of the following:
    (i) a dry skid resistance in the range of u 0.30 to u 0.80, and wet skid resistance in the range of u 0.35 to u 0.60, determined according to F2913-2011, (ii) a Shore A hardness in the range of 20H to 35H and a Shore C hardness in the range of 35H to 48H, determined according to ASTM 02240,
(iii) a compression set of not more than 30%, determined according to SATRA TM156:2002,620n,
(iv) a density in the range of 0.2 to 0.7 mg per cubic meter (mg/m$^3$), determined according to ASTM D297,
(v) an abrasion resistance in the range of about 0.1 to about 0.5 g after 10,000 cycles, determined according to ASTM 03886-99.

14. The sandal of claim 13, wherein the single compound includes:
EVA in the range of 20% to 24% by weight; and
POE in the range of 9% to 13% by weight.

15. The sandal of claim 13, wherein the single compound includes:
EVA 22% by weight; and
POE 11% by weight.

16. The sandal of claim 13, wherein the single compound further includes:
a bridging agent in the range of 0% to 2% by weight.

17. The sandal of claim 16, wherein the single compound further includes a foaming agent in the range of 0% to 4% by weight.

18. The sandal of claim 13, wherein the sandal is formed by a single shot injection molding process.

19. The sandal of claim 13, wherein the sandal is formed by a two step compression molding process.

20. The sandal of claim 13, wherein the upper portion includes one or more straps.

21. The sandal of claim 13, wherein the upper portion includes a toe post.

22. The sandal of claim 13, wherein the upper portion includes a plurality of apertures.

23. The sandal of claim 13, which has a dry skid resistance in the range of u 0.30 to u 0.80; and wet skid resistance in the range of u 0.35 to u 0.60, determined according to F2913-2011.

24. The sandal of claim 13; which has a Shore A hardness in the range of 20H to 35H and a Shore C hardness in the range of 35H to 48H, determined according to ASTM D2240.

25. The sandal of claim 13, which has a compression set of not more than 30%, determined according to SATRA TM156:2002,620n.

26. The sandal of claim 8, which has a density in the range of 0.2 to 0.7 mg per cubic meter (mg/m$^3$), determined according to ASTM D297.

27. The sandal of claim 13; which has an abrasion resistance in the range of about 0.1 to about 0.5 g after 10,000 cycles, determined according to ASTM D3886-99.

28. A sandal, comprising:
a sole portion; and
an upper portion,
wherein the sole portion and the upper portion are composed of a single compound, and
wherein the single compound includes:
styrene ethylene butylene styrene block copolymer (SEBS),
ethyl vinyl acetate copolymer (EVA) in the range of 17% to 27% by weight; and
polyolefin elastomer (POE) in the range of 6% to 16% by weight,
wherein the single compound additionally comprises a rubber which is a styrenic block copolymer (SBC) consisting of polystyrene blocks and rubber blocks, and
wherein the sandal has at least one of the following:
(i) a dry skid resistance in the range of u 0.30 to u 0.80, and wet skid resistance in the range of u 0.35 to u 0.60, determined according to F2913-2011,
(ii) a Shore A hardness in the range of 20H to 35H and a Shore C hardness in the range of 35H to 48H, determined according to ASTM D2240,
(iii) a compression set of not more than 30%, determined according to SATRA TM156:2002,620n,
(iv) a density in the range of 0.2 to 0.7 mg per cubic meter (mg/m3), determined according to ASTM D297,
(v) an abrasion resistance in the range of about 0.1 to about 0.5 g after 10,000 cycles, determined according to ASTM D3886-99.

29. The sandal according to claim 28, wherein the sole is selected from the group consisting of a unitary sole, an insole, an outsole, and a combination of an insole and an outsole.

30. The sandal according to claim 29, wherein the sole comprises an insole and an outsole.

31. The sandal according to claim 30, wherein the insole and the outsole are the same color.

32. The sandal according to claim 30, wherein the insole and the outsole are different colors.

* * * * *

UNITED STATES PATENT AND TRADEMARK OFFICE
CERTIFICATE OF CORRECTION

PATENT NO. : 11,737,512 B2
APPLICATION NO. : 17/143506
DATED : August 29, 2023
INVENTOR(S) : Walter T. Bray and Lex Nichols Page 1 of 1

It is certified that error appears in the above-identified patent and that said Letters Patent is hereby corrected as shown below:

In the Claims

In Column 16, Line 44, "0297" should read --D297--.

In Column 17, Line 3, "02240" should read --D2240--.

In Column 17, Line 10, "03886-99" should read --D3886-99--.

In Column 18, Line 1, "claim 8" should read --claim 13--.

Signed and Sealed this
Twenty-fourth Day of October, 2023

Katherine Kelly Vidal
*Director of the United States Patent and Trademark Office*